(12) United States Patent
Yokota

(10) Patent No.: US 6,815,523 B2
(45) Date of Patent: Nov. 9, 2004

(54) POLYETHER AND ITS PRODUCTION METHOD

(75) Inventor: Akira Yokota, Matsudo (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/386,475

(22) Filed: Mar. 13, 2003

(65) Prior Publication Data

US 2003/0187177 A1 Oct. 2, 2003

(30) Foreign Application Priority Data

Mar. 15, 2002 (JP) .......................... 2002-071631

(51) Int. Cl.⁷ .............................. C08G 65/00
(52) U.S. Cl. ...................... 528/106; 528/116; 528/219; 528/397; 528/401; 528/425
(58) Field of Search ................. 528/106, 116, 528/219, 397, 401, 425

(56) References Cited

U.S. PATENT DOCUMENTS 6,423,811 B1  7/2002  Lau et al.

FOREIGN PATENT DOCUMENTS

JP  2002-88149 A  3/2000

OTHER PUBLICATIONS

Percec, Virgil, et al. Makromol. Chem. vol. 185, pp. 2319–2336, 1984.

*Primary Examiner*—Duc Truong

(74) *Attorney, Agent, or Firm*—Birch, Stewart, Kolasch & Birch, LLP

(57) ABSTRACT

The object of the present invention is to provide an organic polymer excellent in heat resistance and chemical resistance and having a low dielectric constant. This object can be achieved by a polyether resin having a repeating unit of following formula (1):

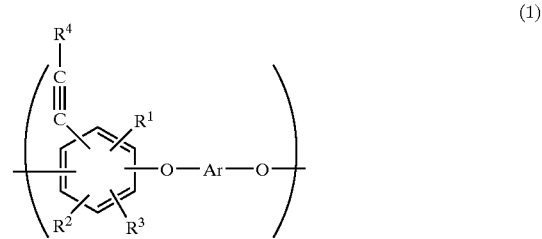

(1)

wherein $R^1$ to $R^3$ independently represent hydrogen atom, a halogen atom, or a substituent, or two of $R^1$ to $R^3$ may be mutually bonded to form a ring; $R^4$ denotes hydrogen atom, an alkyl group with 1 to 10 carbons which may be substituted, a cycloalkyl group with 6 to 10 carbons which may be substituted, an aromatic ring with 6 to 14 carbons which may be substituted, a trialkylsilyl group which may be substituted, or a hydroxyalkyl; and Ar represents a divalent aromatic ring.

12 Claims, No Drawings

POLYETHER AND ITS PRODUCTION METHOD

FIELD OF THE INVENTION

The present invention relates to polyether.

BACKGROUND OF THE INVENTION

An organic polymer has drawn an attention as a material for an insulating film of electronic devices and in order to make it usable for the insulating film, the organic polymer is required to be excellent in heat resistance, chemical resistance and having a low dielectric constant. Among the organic polymers, since polymers having an aromatic ring in its main chain and a thermosetting functional group in the side chain is excellent in heat resistance and chemical resistance, it is considered as a material useful for the insulating film.

For example, an organic polymer obtained by introducing vinyl group into the side chain of polyether sulfone and further modifying the vinyl group to ethynyl group is disclosed in Macromol. Chem. 185, 2319 (1984). Although this polymer is excellent in the heat resistance and the chemical resistance, its dielectric constant is not sufficient and therefore there has been desire for developing an organic polymer with a further decreased dielectric constant.

SUMMARY OF THE INVENTION

The object of the present invention is to provide an organic polymer excellent in heat resistance and chemical resistance and having a low dielectric constant as well.

The inventor of the present invention has enthusiastically made investigations to find an organic polymer free from such problems described above and consequently have found that polyether having ethynyl group is excellent in heat resistance and chemical resistance and having a low dielectric constant and have completed the invention.

That is, the present invention is to provide a polyether having a repeating unit of the following formula (1):

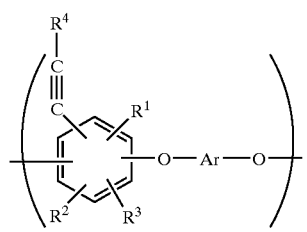

(wherein $R^1$ to $R^3$ independently represent hydrogen atom, a halogen atom, or any substituent, or two of $R^1$ to $R^3$ may be mutually bonded to form a ring; $R^4$ denotes a hydrogen atom, an alkyl group with 1 to 10 carbons which may be substituted, a cycloalkyl group with 6 to 10 carbons which may be substituted, an aromatic ring with 6 to 14 carbons which may be substituted, a trialkylsilyl group which may be substituted, or a hydroxyalkyl; and Ar represents a divalent aromatic group.).

DETAILED DESCRIPTION OF THE INVENTION

Hereinafter, the invention will be described in detail.

A polyether of the present invention comprises a repeating unit having the above-described formula (1), that is, comprises an aromatic ring in the main chain and $—C\equiv C—R^4$ in the side chain.

In the formula (1), $R^1$ to $R^3$ independently represents hydrogen atom, a halogen atom, or a substituent.

The halogen atom includes a chlorine atom, a bromine atom, a fluorine atom, and an iodine atom.

The substituent may include, for example, an alkyl group with 1 to 10 carbons which may be substituted, a cycloalkyl group with 6 to 10 carbons which may be substituted, an alkenyl group with 2 to 10 carbons which may be substituted, an alkynyl group with 2 to 12 carbons which may be substituted, an aryl group with 6 to 14 carbons which may by substituted, an alkoxy group with 1 to 10 carbons which may be substituted; an aryloxy group which may be substituted, a substituent having carbonyl group, or a substituent having a hydroxyalkyl group.

Alkyl group with 1 to 10 carbons described above may include, for example, methyl, ethyl, propyl, iso-propyl, butyl, sec-butyl, tert-butyl, pentyl, hexyl and the like and they may be substituted with an alkoxy group, an alkenyl group, an alkynyl group, an aryl group and the like.

Cycloalkyl group with 6 to 10 carbons described above may include, for example, cyclohexyl and cycloheptyl and the like and they may be substituted with an alkyl group, an alkoxy group, an alkenyl group, an alkynyl group, an aryl group and the like.

Alkenyl group with 2 to 10 carbons described above may include, for example, vinyl, allyl, and propenyl and the like and they may be substituted with an alkyl group, an alkoxy group, an alkenyl group, an alkynyl group, an aryl group and the like.

Alkynyl group with 2 to 10 carbons described above may be included, for example, ethynyl group, propargyl group and the like and they may be substituted with an alkyl group, an alkoxy group, an alkenyl group, an alkynyl group, an aryl group and the like.

Aryl group with 6 to 14 carbons described above may include, for example, phenyl group, naphthyl group and the like and they may be substituted with an alkyl group, an alkoxy group, an alkenyl group, an alkynyl group, a group having an aromatic ring and the like.

Alkoxy group with 1 to 10 carbons described above may include, for example, methoxy group, ethoxy group and the like and they may be substituted with an alkyl group, an alkoxy group, an alkenyl group, an alkynyl group, an aryl group and the like.

Aryloxy group which may be substituted described above may include, for example, phenoxy group, naphthoxy group and the like and they may be substituted with an alkyl group, an alkoxy group, an alkenyl group, an alkynyl group, an aryl group and the like.

Substituent group having carbonyl group described above may include, for example, formyl, acetyl and the like.

Hydroxyalkyl group described above may include, for example, hydroxymethyl group, hydroxyethyl group, hydroxyisopropyl group and the like and they may be substituted with an alkoxy group, an alkenyl group, an alkynyl group, aryl group and the like.

The alkyl group as a substituent may include, for example, the same alkyl group with 1 to 10 carbons as described above.

The alkoxy group as a substituent group may include, for example, the same alkoxy group with 1 to 10 carbons as described above.

The alkenyl group as a substituent group may include, for example, the same alkenyl group with 2 to 10 carbons as described above.

The alkynyl group as a substituent group may include, for example, the same alkynyl group with 2 to 10 carbons as described above.

The aryl group as a substituent group may include, for example, the same aryl group with 6 to 14 carbons as described above.

When any two of $R^1$ to $R^3$ are at the ortho-position, these two may be mutually bonded to form a ring.

The repeating unit of the formula (1) has —C≡C—$R^4$ as a side chain.

In this case, $R^4$ is a hydrogen atom, an alkyl group with 1 to 10 carbons which may be substituted, a cycloalkyl group with 6 to 10 carbons which may be substituted, an aryl group with 6 to 14 carbons which may be substituted, a trialkylsilyl group which may be substituted, or a substituent having a hydroxyalkyl.

The examples of each group except the trialkylsilyl may include respectively the same groups as described above.

Trialkylsilyl which may be substituted may include, for example, trimethylsilyl, triisopropylsilyl and the like and the alkyl group of the trialkylsilyl group may be substituted with an alkoxy group, an alkenyl group, an alkynyl group, an aryl group and the like.

The examples of alkoxy group, the alkenyl group, the alkynyl group, the aryl group as the substituent groups may include respectively the same groups as described above.

Among $R^1$ to $R^3$ of the repeating unit of the formula (1), at least one of $R^1$ to $R^3$ represents preferably as —C≡C—$R^{17}$.

$R^{17}$ represents hydrogen, an alkyl group with 1 to 10 carbons which may be substituted, a cycloalkyl group with 6 to 10 carbons which may be substituted, an aryl group with 6 to 14 carbons which may be substituted, a trialkylsilyl which may be substituted, or a hydroxyalkyl group.

The examples of the alkyl group with 1 to 10 carbons, the cycloalkyl group with 6 to 10 carbons, the aryl group with 6 to 14 carbons, the trialkylsilyl, and the hydroxyalkyl group of $R^{17}$ may include the same groups as above. Further, the examples of the substituent for them may include the same group as above.

—C≡C—$R^4$ and —C≡C—$R^{17}$ are preferably at mutually ortho-positions.

Ar represents a bivalent group having an aromatic ring. Ar may include, for example;

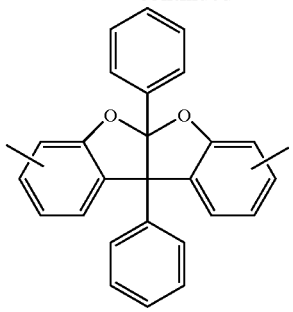

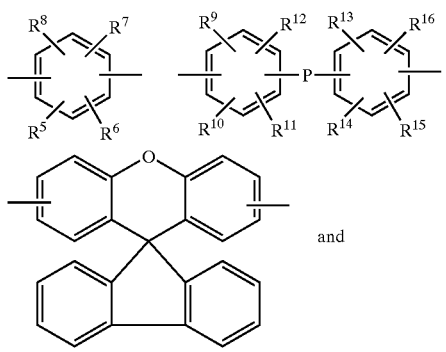

and

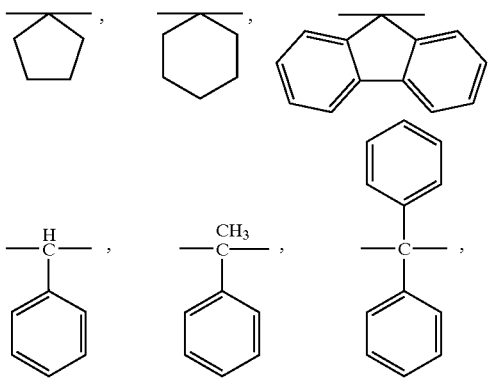

$R^5$ to $R^{16}$ independently represent a hydrogen atom, an alkyl group with 1 to 10 carbons which may be substituted, a cycloalkyl group with 6 to 10 carbons which may be substituted, an alkenyl group with 2 to 10 carbons which may be substituted, an alkynyl group with 2 to 10 carbons which may be substituted, an aryl group with 6 to 14 carbons which may be substituted, an alkoxy group with 1 to 10 carbons which may be substituted, a substituent having carboxyl group, or a hydroxyalkyl group which may be substituted.

The examples of the alkyl group with 1 to 10 carbons, the cycloalkyl group with 6 to 10 carbons, the alkenyl group with 2 to 10 carbons, the alkynyl group with 2 to 12 carbons, the aryl group with 6 to 14 carbons, the alkoxy group with 1 to 10 carbons, the substituent having carboxyl group, and the hydroxyalkyl group which may be substituted may include respectively the same group as described above and the examples of the substituent of them may also include the same group as described above.

P of the above formula represents the direct bond, a hydrocarbon group with 1 to 20 carbons, —O— (ether bond), or —CO— (carbonyl bond).

The hydrocarbon group with 1 to 20 carbons may include, for example, a straight chain or branched alkylene such as —CH$_2$—, —C(CH$_3$)$_2$—, —CH(CH$_3$)—, —C(CH$_3$)(CH$_2$CH$_3$)—, —C(CH$_3$)(CH$_2$CH(CH$_3$)$_2$)—, and one selected from the group consisting of the following groups:

$R^1$ to $R^{16}$ and P are usually selected depending on the properties required for the polyether to be obtained. For example, from the viewpoint of decreasing the dielectric constant of the polyether, $R^1$ to $R^{16}$ and P may be preferable to be bulky groups. Further, from the viewpoint of increasing the heat resistance, a direct bond, —O— (ether bond) and one selected form the group consisting of following groups:

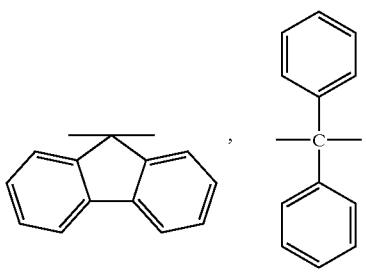

are preferable.

The polyether resin of the present invention can be obtained by condensation reaction of a dihalogen compound having the following formula (2):

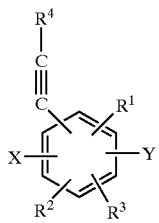

(2)

(X and Y independently represent a halogen atom; and $R^1$ to $R^4$ represent the same as those described above.) and a dihydroxy compound having the following formula (3):

HO—Ar—OH  (3)

(Ar represents the same as that described above) in the presence of an alkali.

X and Y independently represent a halogen atom and the halogen atom include chlorine atom, bromine atom, fluorine atom, and iodine atom, and fluorine atom or chlorine atom is preferable from the viewpoint of the reaction rate.

As the dihydroxy compound, bisphenols are preferable.

The bisphenols are not particularly restricted as far as they contain two phenolic OH groups in one molecule. The examples of them may include bisphenol A, bisphenol F, biphenol, cyclohexylidenebisphenol, bis(hydroxyphenyl) methanone, (1-methyl-ethylidene)bis[2-cyclohexylphenol], cyclohexylidenebis[2-cyclohexylphenol], 9,9-bis(4-hydroxyphenyl)fluorene and the like and two or more kinds of them may be used in form of a mixture.

The alkali to be used in the condensation reaction is not particularly limited, and it may include, for example, sodium hydroxide, potassium hydroxide, sodium carbonate, potassium carbonate and the like and they may be used in form of a solid or in form of a solution such as an aqueous solution.

Further, the condensation reaction is preferable to be carried out in the presence of a solvent.

The solvent is not particularly limited, and from the viewpoint of the high reaction rate due to high solubility in the above-mentioned compounds represented by formula (2) and (3), dimethylformamide, dimethylacetamide, dimethylsulfoxide and benzophenone are preferably used.

Further, the condensation reaction is preferable to be carried out in atmosphere of an inert gas such as nitrogen, argon and the like.

The reaction temperature of the condensation reaction is not particularly limited, and, from the view point of the reaction rate, it is preferably from about 50° C. to about 300° C. and more preferably from about 100° C. to about 200° C.

When $R^4$ or $R^{17}$ is protection groups in the case where at least one of $R^1$ to $R^3$ is —C≡—C—$R^{17}$, these protection groups may be removed during the condensation reaction.

For example, —C≡C—Si(CH$_3$)$_3$ group and —C≡C—C(CH$_3$)$_2$OH group are converted into —C≡CH by removing Si(CH$_3$)$_3$ group or (CH$_3$)$_2$OH group as the protection group during condensation reaction.

A production method of a dihalogen compound represented by the general formula (2) is not particularly limited, and, for example, it can be produced by coupling of a halogen compound represented by the following formula (5) and an ethynyl compound represented as HC—C≡C—$R^4$:

(5)

(Z represent a halogen atom.).

The halogen atom Z may include, a chlorine atom, a bromine atom, a fluorine atom, and an iodine atom and from the viewpoint of the reactivity, chlorine atom or iodine atom is preferable.

The coupling reaction can be carried out by a conventional method using a palladium catalyst and the like as a catalyst.

In the polyether resin of the present invention, at least one of $R^1$ to $R^3$ is preferably —C≡C—$R^{17}$. At the time of cross-linking, the degree of the cross-linking may be increased if at least one of $R^1$ to $R^3$ is —C≡C—$R^{17}$ and accordingly the heat resistance may be increased.

Further, the polyether of the present invention having two or more C≡C at neighboring positions of a benzene ring is preferable, from the viewpoint of decreasing the cross-linking temperature.

The polyether of the present invention has a weight average molecular weight of preferably 50,000 or lower, more preferably 30,000 or lower, on the basis of polystyrene conversion by GPC. If the molecular weight exceeds 50,000, the viscosity of it in form of a coating solution may be considerably increased to result in the tendency of making coating difficult.

The polyether having the repeating unit represented by the formula (1) thus obtained by the above-described method may be used after being cross-linked by a conventional method.

As the cross linking method, for example, methods may include heating, electron beam, light beam and the like.

In the case of cross-linking by heating, the cross-linking temperature may be controlled by selecting $R^4$. For example, if $R^4$ is hydrogen atom, the cross-linking temperature becomes a relatively low temperature. On the other hand, if $R^4$ is an aromatic ring, the cross-linking temperature becomes a relatively high temperature.

By carrying out cross-linking in such a manner, a thermosetting polyether having excellent heat resistance, chemical resistance, and insulating property can be obtained.

The polyether of the present invention can be used as an insulating material for such as an inter layer dielectric film of a semiconductor or LCD, an insulating material for a printed wiring material of a copper-clad laminate board and the like and is preferable to be used as an insulating film.

The insulating film can be produced by obtaining a coating solution by dissolving the polyether of the present invention (A) in an organic solvent (B), applying the coating solution by a spin coating method, a roller coating method, a dip coating method and the like, and further, curing the polyether by heating treatment, light radiation and the like, if necessary. In order to achieve a low dielectric constant of the obtained insulation film, it is preferable to avoid deteriorating the film quality by oxidation and the like, and the heating treatment, light radiation and the like is preferable to be carried out under inactive atmosphere conditions such as under nitrogen atmosphere, vacuum or the like. On the other hand, in the case of carrying out production by curing at a low temperature, it is preferable to carry out in an atmosphere containing oxygen.

The coating solution contains the polyether of the present invention (A) and the organic solvent (B), and the organic solvent (B) is not particularly limited as far as it can dissolve the polyether resin of the present invention (B) therein.

The organic solvent (B) may include, for example, an aliphatic hydrocarbon solvent such as hexane, heptane, cyclohexane and the like; a hydrocarbon solvent such as benzene, toluene, xylene and the like; an alcohol solvent such as methanol, ethanol, isopropanol, 1-butanol, 2-ethoxymethanol, 2-ethoxyethanol, 3-methoxypropanol, and the like; a ketone solvent such as acetylacetone, methyl ethyl ketone, methyl isobutyl ketone, 3-pentanone, 2-heptanone, and the like; an ester solvent such as propyl acetate, butyl acetate, isobutyl acetate, propylene glycol monomethyl ether acetate, ethyl lactate, and the like; an ether solvent such as diisopropyl ether, dibutyl ether, anisole and the like; and the like. To the organic solvent (B), an additive such as a surfactant, a silane coupling agent and the like may be added.

An insulating film may be formed using the coating solution for the insulating film, and a porous insulating film may be obtained by a conventional method.

The method for forming the porous insulating film may include method by adding a solvent having a higher boiling point than that of (B), method by adding a resin having a lower thermal decomposition temperature than that of (A) to the coating solution containing (A) and (B), and method by grafting (A) with a polymer chain having a lower thermal decomposition temperature than that of (A) and the like.

EXAMPLES

Hereinafter, the invention will be described further in details with reference to examples, which are not intended to limit the scope of the present invention.

Reference Example 1
Production of Monomer Having Trimethylsilylethynyl

A 500 ml four-neck flask was charged with 2,4-difluorobromobenzene (23.2 g), triethylamine (200 g), and Cu(I)I (0.6 g) and left for 1 hour under Ar flow. After the flask was further charged with Pd(0) (TPP)$_4$ (1.7 g), trimethylsilylacetylene (21.6 g) was added dropwise during 10 minutes. The resulting mixture was heated to 80° C. and stirred while being kept at 80° C. for 6 hours and then stirred overnight at a room temperature. After filtration and removing the solvent by distillation, the obtained liquid layer was subjected to column treatment by hexane solvent and then to solvent removal by distillation to obtain an aimed substance.

1H and 13C NMR spectra gave results supporting the production of an aimed substance. The monomer obtained was referred to monomer A.

Reference Example 2
Production of Monomer Having Phenylethynyl

A 500 mL four-neck flask was charged with 3,5-difluorobromobenzene (19.3 g), triethylamine (200 g), and Cu(I)I (0.6 g) and left for 1 hour under Ar flow. After the flask was further charged with Pd(0) (TPP)$_4$ (1.7 g), phenylacetylene (10.7 g) was added dropwise during 10 minutes. The resulting mixture was heated to 80° C. and stirred while being kept at 80° C. for 6 hours and then stirred overnight at a room temperature. After filtration and removing the solvent by distillation, the obtained liquid layer was subjected to column treatment by toluene solvent and then to toluene removal by distillation to obtain an aimed substance. 1H and 13CNMR spectra gave results supporting the production of an aimed substance. The monomer obtained was referred to monomer B.

Reference Example 3
Production of Monomer Having Two Phenylethynyl Groups

A 500 mL four-neck flask was charged with 1,2-dibromo-3,5-difluorobromobenzene (19.0 g), triethylamine (200 g), and Cu(I)I (0.7 g) and left for 1 hour under Ar flow. After the flask was further charged with Pd(0) (TPP)$_4$ (2.0 g), ethynylbenzene (15.3 g) was added dropwise during 10 minutes. The resulting mixture was heated to 80° C. and stirred while being kept at 80° C. for 6 hours and then stirred overnight at a room temperature. After filtration and removing the solvent by distillation, the obtained liquid layer was subjected to LC measurement to find two high peaks appearing. The component of the one peak was separated by column treatment and hexane was removed by distillation to obtain an aimed substance. 1H and 13C NMR spectra gave results supporting the production of an aimed substance. The monomer obtained was referred to monomer C.

Examples 1 to 3
Production of Polymer Having Ethynyl in Side Chain

A 500 mL four-neck flask was charged with 4,4'-(9H-fluoren-9-ylidene)bisphenol (9.6 g), potassium carbonate (10.4 g), the monomer A 5.4 g, dimethyl sulfoxide 150 g, and toluene 80 g and stirred while being heated at 150° C. for 4 hours. The reaction product was added to a methanol/acetic acid solution and precipitated. The precipitated crystal was filtered, washed with a large quantity of methanol, and vacuum dried to obtain a resin product. It was referred to resin A.

In the same manner, the resin produced from the monomer B was referred to resin B and the resin produced from the monomer C was referred to resin C.

The respective resins are collectively shown in Table 1

TABLE 1

| | Monomer (bisphenol) | Monomer (halogenide) |
|---|---|---|
| Example 1 Resin A | fluorene bisphenol | 1-(2,4-difluorophenyl)-2-(dimethylsilyl)acetylene |
| Example 2 Resin B | fluorene bisphenol | 1-phenyl-2-(3,5-difluorophenyl)acetylene |
| Example 3 Resin C | fluorene bisphenol | 1,3-bis(phenylethynyl)-4,6-difluorobenzene |

Examples 4 to 6
Results of Evaluation of Polymers Having Ethynyl Group in Side Chain The resins A to C were respectively dissolved in anisole so as to adjust the solids in 10% by weight. The prepared respective solutions were filtered by a 0.2 μm filter and applied to a 4-inch silicon wafer at a rotation speed of 2,000 rpm and baked at 150° C. for 1 minute and then subjected to heating treatment at 400° C. for 30 minutes under nitrogen atmosphere.

The coating films thus obtained were immersed in solvents used respectively for the coating solutions for 1 minute to investigate the solvent resistance. Also, the dielectric constant measurement for the respective films was carried out. Further, the exothermal peak temperature was measured by DTA measurement and the resulting temperature was determined as the cross-linking temperature. The results were shown in Table 2.

TABLE 2

| Sample | | Dielectric constant | Solvent resistance | Cross-linking temperature |
|---|---|---|---|---|
| Example 4 | Resin A | 2.8 | ○ | 270° C. |
| Example 5 | Resin B | 2.8 | ○ | 350° C. |
| Example 6 | Resin C | 3.1 | ○ | 320° C. |

According to the present invention, it can be achieved to provide an organic polymer excellent in heat resistance and chemical resistance and having a low dielectric constant.

What is claimed is:

1. A polyether having a repeating unit of the following formula (1):

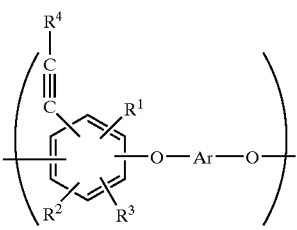

(1)

wherein $R^1$ to $R^3$ independently represent a hydrogen atom, a halogen atom, or a substituent, or two of $R^1$ to $R^3$ may be mutually bonded to form a ring; $R^4$ denotes hydrogen atom, an alkyl group with 1 to 10 carbons which may be substituted, a cycloalkyl group with 6 to 10 carbons which may be substituted, an aromatic ring with 6 to 14 carbons which may be substituted, a trialkylsilyl group which may be substituted, or a hydroxyalkyl; and Ar represents a divalent aromatic group.

2. The polyether according to claim 1, wherein the substituent of formula (1) is an alkyl group with 1 to 10 carbons which may be substituted, a cycloalkyl group with 6 to 10 carbons which may be substituted, an alkenyl group with 2 to 10 carbons which may be substituted, an alkynyl group with 2 to 12 carbons which may be substituted, an aryl group with 6 to 14 carbons which may by substituted, an alkoxy group with 1 to 10 carbons which may be substituted; an aryloxy group which may be substituted, a substituent having carbonyl group, or a substituent having a hydroxyalkyl group.

3. The polyether according to claim 1, wherein Ar in formula (1) is one selected from the group consisting

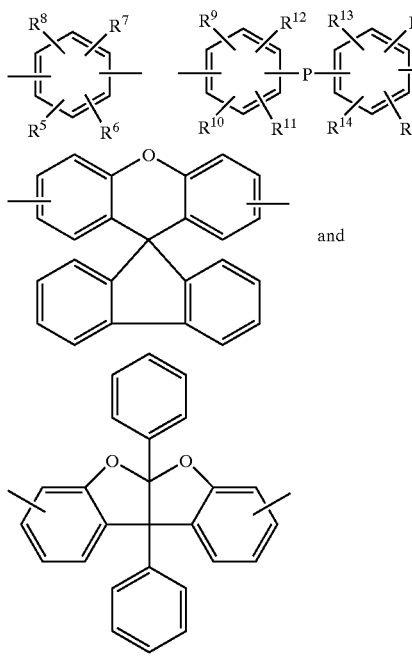

wherein $R^5$ to $R^{16}$ independently represent a hydrogen atom, an alkyl group with 1 to 10 carbons which may be substituted, a cycloalkyl group with 6 to 10 carbons which may be substituted, an alkenyl group with 2 to 10 carbons which may be substituted, an alkynyl group with 2 to 10 carbons which may be substituted, an aryl group with 6 to 14 carbons which may be substituted, an alkoxy group with 1 to 10 carbons which may be substituted, a substituent having carboxyl group, or a hydroxyalkyl group which may be substituted, and P represents the direct bond, a hydrocarbon group with 1 to 20 carbons, —O— (ether bond), or —CO— (carbonyl bond).

4. The polyether according to claim 1, wherein at least one of $R^1$ to $R^3$ is —C≡C—$R^{17}$ wherein $R^{17}$ represents hydrogen, an alkyl group with 1 to 10 carbons which may be substituted, a cycloalkyl group with 6 to 10 carbons which may be substituted, an aryl group with 6 to 14 carbons which may be substituted, a trialkylsilyl which may be substituted, or a hydroxyalkyl group.

5. The polyether according to claim 4, wherein —C≡C—$R^4$ and —C≡C—$R^{17}$ are preferably at mutually ortho-positions.

6. The polyether according to any one of claims 1–5 wherein $R^4$ is hydrogen.

7. The polyether according to any one of claims 1–5 wherein $R^4$ is an aryl group with 6 to 14 carbons which may be substituted.

8. A process for producing a polyether comprising condensation reaction of a dihalogen compound having the following formula (2):

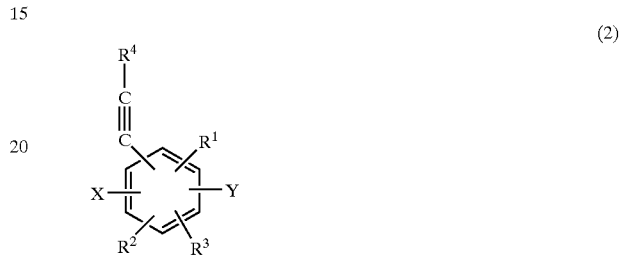

(2)

wherein X and Y independently represent a halogen atom; and $R^1$ to $R^4$ represent the same as those described above, and a dihydroxy compound having the following formula (3):

(3)

wherein Ar represents a divalent aromatic group, in the presence of an alkali.

9. The process according to claim 8, wherein the dihydroxy compound is bisphenols.

10. An insulating material comprising the polyether according to claim 1.

11. A coating solution for insulating film containing the polyether according to claim 1 and an organic solvent.

12. An insulating film obtained from the coating solution according to claim 11.

* * * * *